Fig.1.

Jan. 17, 1950   A. GREINER ET AL   2,494,872
METHOD AND APPARATUS FOR BENDING
TUBULAR GLASS ARTICLES
Filed Jan. 26, 1945   9 Sheets-Sheet 3

Inventors:
Alfred Greiner,
August W. Seitz,
by John H. Anderson
Their Attorney.

Inventors:
Alfred Greiner,
August W. Seitz,
by John H Anderson
Their Attorney.

Inventors:
Alfred Greiner,
August W. Seitz,
by John H Anderson
Their Attorney.

A. GREINER ET AL 2,494,872

METHOD AND APPARATUS FOR BENDING
TUBULAR GLASS ARTICLES

Filed Jan. 26, 1945

Inventors:
Alfred Greiner,
August W. Seitz,
by John H Anderson
Their Attorney.

Patented Jan. 17, 1950

2,494,872

UNITED STATES PATENT OFFICE 2,494,872

METHOD AND APPARATUS FOR BENDING TUBULAR GLASS ARTICLES

Alfred Greiner, Cleveland Heights, and August W. Seitz, Euclid, Ohio, assignors to General Electric Company, a corporation of New York Application January 26, 1945, Serial No. 574,724

30 Claims. (Cl. 49—7)

Our invention relates, in general, to method and apparatus for bending glass tubing into arcuate or circular shape, and more particularly to method and apparatus for bending tubular electric lamps or discharge devices, such as fluorescent lamps, into circular shape.

One object of our invention is to provide a method and apparatus for bending tubular glass articles into true arcuate or circular shape while maintaining the cross-sectional shape thereof.

Another object of our invention is to provide a method and apparatus for bending the glass envelope assembly of a tubular electric lamp into true arcuate or circular shape while maintaining the cross-sectional shape thereof.

Still another object of our invention is to provide a method and apparatus for bending the glass envelope assemblies of tubular electric lamps into true arcuately or circularly shaped envelopes of substantially uniform arcuate extent.

Further objects and advantages of our invention will appear from the following description of a species thereof and from the accompanying drawings in which:

In accordance with the invention, the tubular glass envelope assembly which is to be bent is first heated to a temperature at which it is readily deformable and at which it attains a predetermined elongation, whereupon one end of the envelope is attached to the periphery of a rotatable drum and the drum then rolled along the envelope to cause the envelope to be bent or wrapped around the drum periphery.

Figure 6:
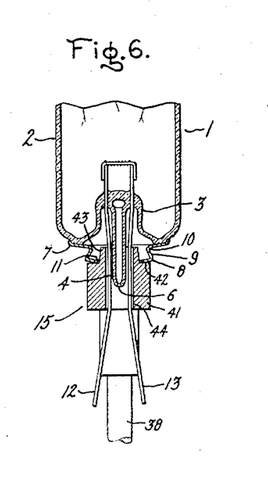
Fig. 6 is a fragmentary vertical section on the line 6—6 of Fig. 1 and showing the lower holder for the lamp envelope assembly.

The drawings illustrate one embodiment of apparatus according to the invention for bending into circular shape a tubular electric lamp envelope assembly 1, for example, a fluorescent lamp of the general type in common use at present. The said lamp envelope assembly 1 comprises a tubular glass envelope 2 having an electrode mount 3 (Fig. 6) sealed into each end thereof as well as exhaust tubes 4 and 5 extending longitudinally from the opposite ends of the envelope. The exhaust tube 4 at one end of the envelope 2 extends axially thereof while the other exhaust tube 5 is offset a sufficient distance relative to the envelope axis to clear the envelope end carrying the tube 4, during the final stages of the envelope bending operation. The axial exhaust tube 4 is partially closed at its outer end to provide a constricted opening 6 (Fig. 6) for retarding the outward flow of the inert gas, such as nitrogen, which is introduced into the envelope through the other exhaust tube 5 during the bending operation. In the particular form of lamp illustrated, the opposite ends of the envelope 2 are further provided with metal end caps 7 which may be made of chrome iron and fusion sealed directly to the glass of the envelope. The said end caps 7 are each formed with a centrally located outwardly projecting boss 8 the annular side wall 9 of which is relieved or tapered inwardly to thereby form a constriction or reduced diameter portion 10 at the base of the boss. The top wall of the boss 8 is provided with a central aperture 11 of circular form through which project the exhaust tubes 4, 5 and the lamp leading-in wires 12, 13.

The apparatus according to the invention for bending the envelope assembly 1 into circular shape comprises upper and lower vertically aligned holders 14 and 15, respectively, for vertically supporting the said envelope assembly at its opposite ends, with the offset exhaust tube 5 uppermost. The upper holder 14 is supported on a framework 16 which extends upward from a table or base 17 and consists of a pair of upstanding side bars or angle irons 18, 18 fastened to the table 17 and bridged at their upper ends by a cross bar 19. The upper holder 14 is secured to the cross bar 19 at a point midway between the frame side bars 18.

Figure 3:
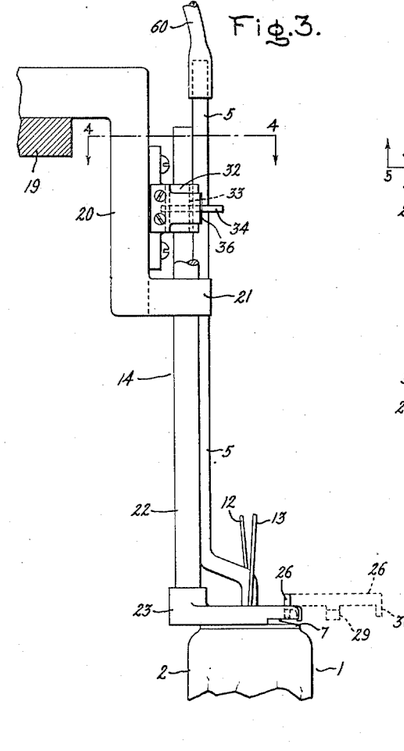
Fig. 3 is a fragmentary vertical section, on the line 3—3 of Fig. 2, showing in elevation the upper holder for the tubular lamp envelope assembly.
Figure 4:
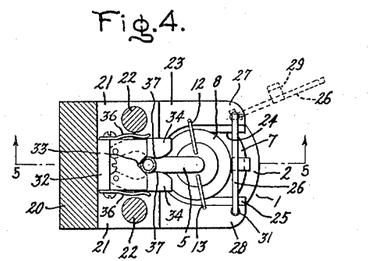
Fig. 4 is a horizontal section on the line 4—4 of Fig. 3.
Figure 5:
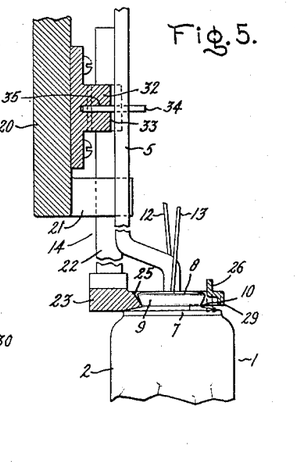
Fig. 5 is a vertical section on the line 5—5 of Fig. 4.

As shown particularly in Figs. 3 to 5, the upper holder 14 comprises an L-shaped support bracket 20 fastened to and depending from the cross bar 19 and having a pair of legs 21, 21 extending horizontally from its lower end and spaced apart to thereby provide a passageway therebetween for the accommodation of the upwardly extending lamp exhaust tube 5. The two legs 21 of the bracket 20 carry a pair of depending rods 22, 22 to the lower extremity of which is fastened a lamp carrier jaw 23 having a U-shaped recess 24 for receiving the metal end cap 7 on the upper end of the lamp envelope 2. The upper edge of the recess 24 in the carrier jaw 23 is beveled, as indicated at 25 in Fig. 5, to thereby provide a seat on which the flaring side wall 9 of the lamp end cap 7 is adapted to rest to thereby support the lamp envelope assembly 1.

Suitable locking means are provided on the carrier jaw 23 for locking the lamp end cap 7 in place within the recess 24 after it has been inserted to the limit of its movement thereinto. In the particular case illustrated, the said locking means comprises a horizontally swinging latch bar or gate 26 pivoted on one of the arms 27 of the carrier jaw 23. In its closed or locked position, the latch bar 26 extends across the outer ends of the carrier jaw arms 27 and 28 so as to bridge the open end of the recess 24, the latch bar 26 being provided with a centrally located depending tongue 29 which projects down beyond the top of the boss 8 on the end cap 7 positioned in the carrier jaw 23 to thereby prevent any movement of the end cap outwardly of the recess 24. To lock the latch bar 26 in its closed position, the free end of the bar is provided with a small depending lug 30 which is inserted in an aperture 31 in the arm 28 of the carrier jaw 23 after the latch bar has been swung to its closed position. The latch bar 26 is loosely pivoted in the carrier jaw arm 27 so as to be capable of a limited amount of vertical swinging movement at least sufficient to enable the free end of the bar 26 to be swung over the top of the arm 28 and the lug 30 inserted in the aperture 31.

The upper holder 14 is further provided with holding means for the offset exhaust tube 5 of the lamp, the said holding means comprising a small block 32 secured to the holder bracket 20 and having a vertically extending V-notch 33 in its front face for receiving the exhaust tube 5 therein. The said exhaust tube 5 is held within the V-notch 33 by means of a cooperating pair of spring-pressed horizontally pivoted jaws 34 which are pivotally mounted in the block 32 within a horizontal slot 35 therein. The jaws 34 are pressed against the exhaust tube 5 by plate springs 36 secured at one end to the sides of the block 32 and having their free ends bearing against the jaws 34. The facing edges of the spring-pressed jaws 34 are formed with tapered tube-engaging portions 37 which converge towards the free or outer ends of the jaws so as to continuously urge and press the exhaust tube 5 back against the walls of the V-notch 33.

The lower holder 15 for the envelope assembly 1 comprises a vertically reciprocable rod 38 mounted in a vertical sleeve bearing 39 fastened to the upper side of the table top 40. The upper end of the rod 38 carries a short arm 41 provided with an annular seat 42 (Fig. 6) which is adapted to engage the end wall of the cap 7 on the lower end of the envelope 2. The said arm 41 is further provided with an upstanding frustro-conical boss 43 concentric with the seat 42 and adapted to be inserted into the opening 11 in the lower lamp end cap 7 to thereby center and hold the lower end of the envelope assembly in place, thus maintaining the vertical positioning of the envelope assembly. The arm 41 is further provided with a vertical bore 44, concentric with the seat 42 and boss 43, for the accommodation of the lamp exhaust tube 4 and the leading-in wires 12, 13.

Upon being mounted in place in the holders 14 and 15, the envelope assembly 1 is heated in an oven 45 to a temperature at which it first becomes readily deformable. During this heating operation, however, the envelope 2 tends to elongate to a certain degree. To permit the free elongation of the envelope, the lower holder 15 is provided with suitable floating support means 46 (Fig. 1) for enabling the said holder to "float" in any given vertical position within the limits of its vertical reciprocating movements. As a result, the lower holder 15 offers practically no resistance at all to the elongation of the envelope 2, the latter merely pushing down the lower holder 15 as it elongates. The said floating support means 46 comprises a more or less horizontally disposed counterweighted lever 47 pivotally mounted intermediate its ends on a depending bracket 48 secured to the underside of the table top 40. One arm of the lever 47 carries a suitable counterweight 49 while the other arm is connected by a vertical link 50 to the lower end of the holder rod 38 which projects down through an opening 51 in the table top 40.

The oven 45 for heating the lamp envelope 2 may be in the form of an elongated electric furnace which is of sufficient length to completely receive the lamp envelope 2 therein and which will heat the envelope substantially uniformly throughout its entire length. The furnace 45 is maintained at a temperature slightly above the temperature at which the glass lamp envelope 2 becomes readily deformable. In the case of a soft lead-glass envelope for instance, the temperature of the furnace will be around 700 to 800° C. or thereabouts. To prevent cracking of the glass envelope 2 upon being subjected to the high temperature of the furnace 45, the envelope 2 is preferably preheated prior to its insertion in the furnace.

Figure 1:
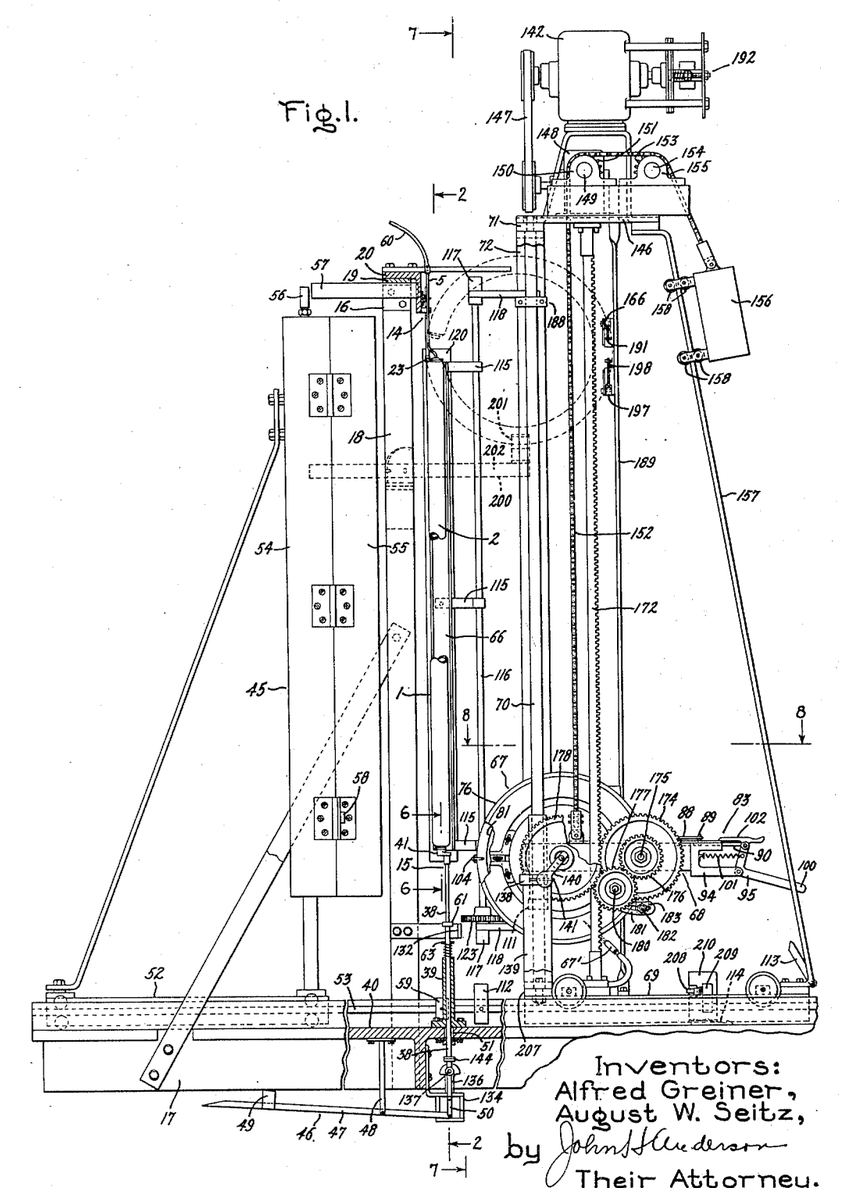
Fig. 1 is a side elevation of apparatus comprising our invention.
Figure 2:
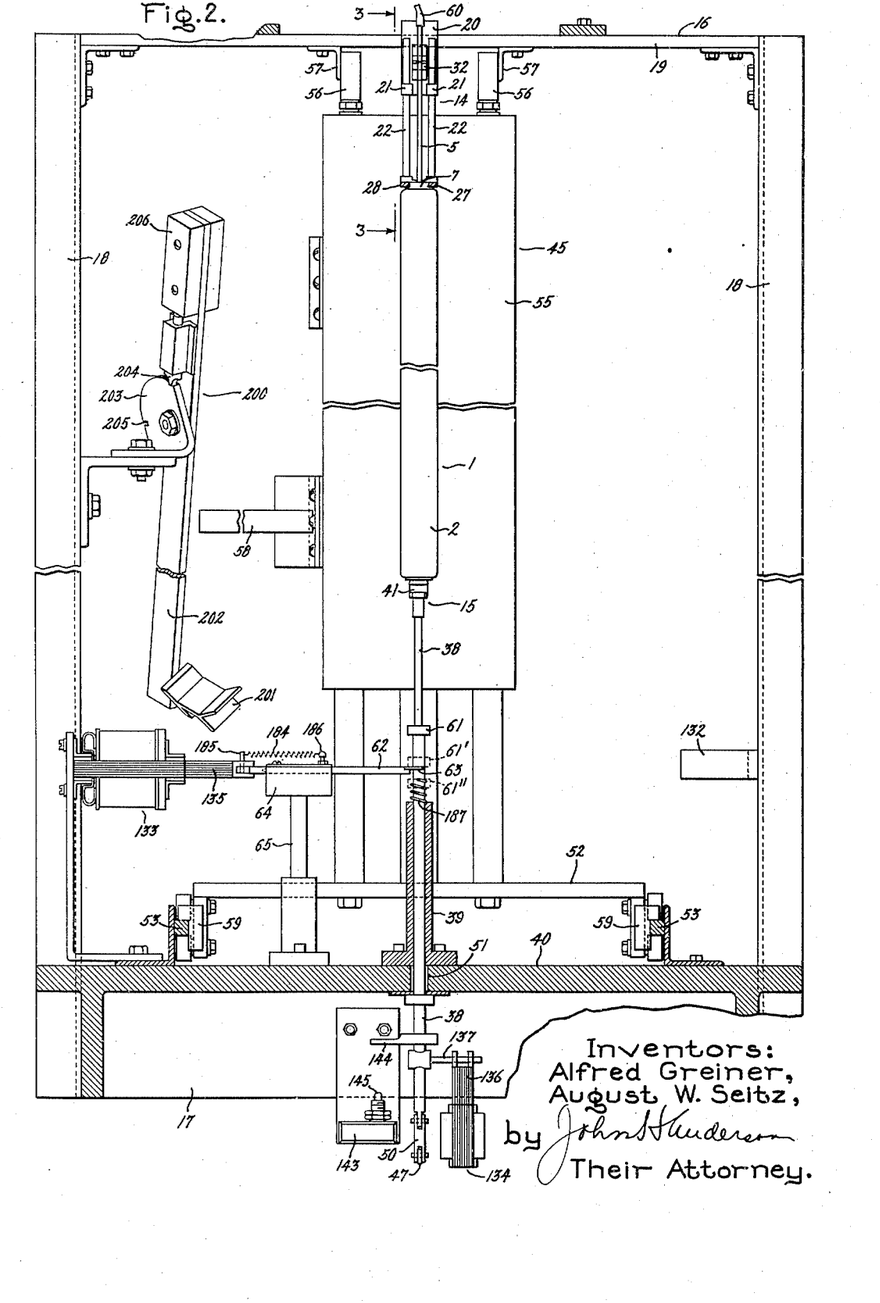
Fig. 2 is a vertical section on the line 2—2 of Fig. 1, showing the envelope supporting and heating means of the apparatus shown in Fig. 1.

As shown in Figs. 1 and 2, the furnace 45 is supported in a vertical position on a carrier or carriage 52 which rides on a horizontal track 53. The said track 53 is mounted on the upper side of the table top 40 and extends through, and normal to the plane of, the supporting framework 16 for the upper lamp holder 14. The furnace 45 is vertically divided into a stationary rear section 54 and a swinging front section 55 which may be swung open to allow the introduction of the lamp envelope 2 into the furnace. The upper and lower end walls of the furnace 45 are provided with suitable openings for the accommodation, respectively, of the upper lamp exhaust tube 5 and upper holder rods 22, and the lower holder support rod 38. At its upper end the furnace 45 is provided with a spaced pair of rollers 56 rotating on vertical axes and arranged to engage a cooperating pair of spaced guide bars 57 fastened to the underside of the frame cross bar 19 to thereby guide and additionally support the upper end of the furnace.

The enclosure of the lamp envelope 2 within the furnace 45 is accomplished by first swinging open the front furnace section 55 by means of a handle 58 thereon, and then advancing the furnace carriage 52 along the track 53 until the furnace is located in its envelope heating position as determined by the engagement of the carriage 52 with stops 59 on the track 53. This advancing movement of the carriage 52 along the track, as well as the subsequent retracting movement thereof, may be effected by suitable automatic means, such as by an air cylinder A (Figs. 16 and 17) the piston of which is connected to the carriage 52 by a connecting rod 52'. With the furnace 45 thus advanced to its envelope heating position, the front section 55 of the furnace is then swung to its closed position to thereby complete the enclosing of the lamp envelope 2 within the furnace. During the heating of the envelope 2 in the furnace 45, and also during the ensuing bending operation, nitrogen or other suitable inert gas such as argon, forming gas (which is a mixture of nitrogen and hydrogen), etc., is introduced into the envelope 2, through a rubber tube 60 connected to the exhaust tube 5, to prevent heat deterioration of the fluorescent powder coating on the inner surface of the envelope wall as well as to prevent oxidation of the metal parts of the lamp electrodes.

The heating of the lamp envelope 2 in the furnace 45, with consequent elongation of the envelope, continues until the envelope attains a temperature at which it just becomes deformable and capable of being bent. At this temperature, the envelope 2 will have elongated a predetermined amount.

In accordance with the invention, suitable means are employed for providing an indication of when the envelope has attained such a predetermined elongation and therefore possesses the necessary temperature for bending, the said indicating means comprising a collar 61 on the lower holder support rod 38 and a limiting stop 62 therefor in the form of a horizontally reciprocable slide bar having a forked end 63 partially surrounding the rod 38 and underlying the collar 61 so as to be engaged thereby. The bar 62 is slidably mounted in a slide block 64 (Fig. 2) supported on an upstanding standard 65 mounted on the table top 40, whereby the said slide bar may be withdrawn out from under the collar 61 on rod 38 to thereby permit further downward movement of the lower holder 15.

In addition to providing an indication of when the envelope 2 has attained the required elongation and therefore the required bending temperature, the engagement of the collar 61 with the slide bar 62 (as shown in dotted lines at 61' in Fig. 2) also serves to limit further elongation of the lamp envelope. In this manner, the various individual lamp envelope assemblies 1, which are to be bent, will all possess the same overall length at the outset of the bending operation and therefore will possess uniform circular length at the completion of the bending operation.

When the envelope 2 has been heated to proper bending temperature, as indicated by the engagement of the stop 62 by the collar 61 on the lower holder rod 38, the envelope assembly 1 is withdrawn from the furnace 45, an envelope back support 66 immediately brought into engagement with or closely adjacent the envelope 2, and the lower end of the envelope immediately clamped to the periphery of a forming mold or drum 67 rotatable about a horizontal axis, which drum is then moved bodily upward and simultaneously rotated about its axis to thereby wrap the envelope 2 around the periphery of the drum. The withdrawal of the envelope assembly 1 from the furnace 45 is effected by first swinging the front section 55 of the furnace to its open position, and then moving the furnace carriage 52 backwards a sufficient distance to be out of the way during the subsequent operation of the apparatus.

Figure 7:
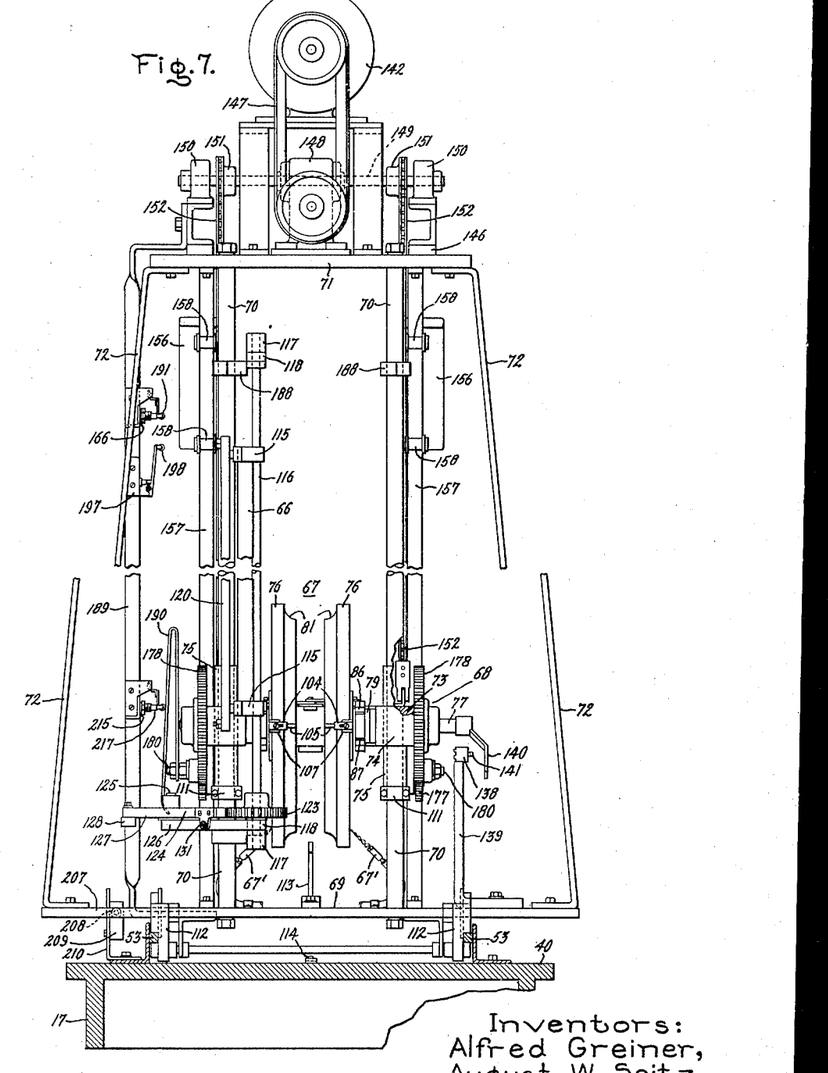
Fig. 7 is a vertical section on the line 7—7 of Fig. 1, showing the drum assembly carriage of the apparatus comprising our invention.

The winding drum or form 67 is supported in a vertically movable lift carriage 68 which, in turn, is carried on a horizontally movable drum assembly carriage or carrier 69 riding on the track 53. The drum assembly carriage 69 is provided with a pair of upstanding parallel guide columns 70 which are spaced apart laterally of the carriage track 53 and on which the lift carriage 68 is slidably mounted for vertical movement therealong. The upper end of the vertical guide columns 70 are secured to the cross-bar member 71 of an upstanding framework supported on the carriage 69 and comprising a pair of side bars 72 (Fig. 7) bridged at their upper ends by the said cross-bar 71.

The drum lift carriage 68 comprises a horizontally disposed U-shaped frame or yoke 73 slidably mounted on the guide columns 70 and carrying the drum 67 between the two arms 74 of the U-frame. The said frame arms 74 are provided with vertically extending sleeve bushings 75 which have a sliding fit on the guide columns 70 to thus support the frame 73 in its horizontal position.

The drum or form assembly 67 on which the envelope 2 is wound comprises duplicate corresponding parts which have been given the same reference numeral, including a pair of facing discs 76 which are axially separable relative to one another and which are mounted on individual horizontally disposed shafts 77 extending transversely of the track 53 and journalled in the arms 74 of the carriage frame 73. The discs 76 are fastened at their outer sides to flanges 78 on hubs or collars 79 which are mounted on and fixedly secured to the shafts 77, as by set screws for instance. The peripheries of the discs 76 are annularly recessed or grooved at the inner faces of the discs to provide identical complementary annular groove portions 80 which, when the two discs 76 are brought together into face to face abutting engagement, conjointly form an annular envelope-receiving groove or channel 81 conforming to the cross-sectional shape of the envelope 2. The peripheries of the two discs 76, including the grooved portions 80 thereof, are preferably covered with asbestos 82 or other suitable heat insulating material to thereby prevent cracking of the heated glass envelope 2 upon contact with the reshaping drum 67. To further insure against such cracking of the heated glass envelope, the drum 67, during use of the apparatus, may be maintained in a heated condition by suitable means, such as by gas fires from a pair of burners 67' located beneath and outwardly of the drum discs 76 and mounted on the carriage 69 to direct the gas fires angularly upward and inward against the drum discs when the drum 67 is in its lowered or starting position.

Figure 8:
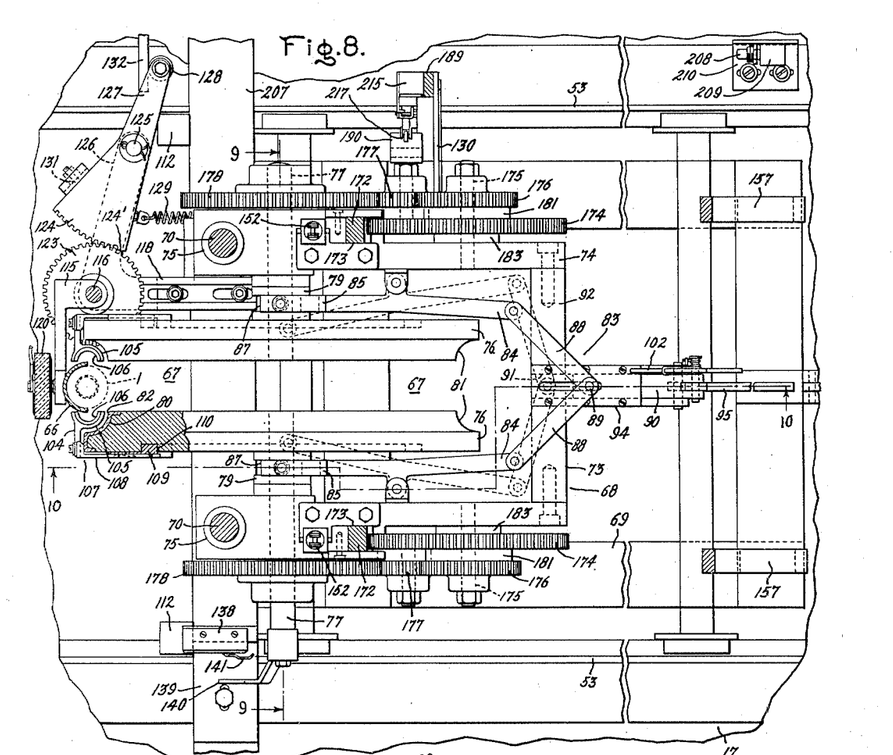
Fig. 8 is a horizontal section on the line 8—8 of Fig. 1 but with the drum assembly carriage shown in its forward or operative position.
Figure 9:
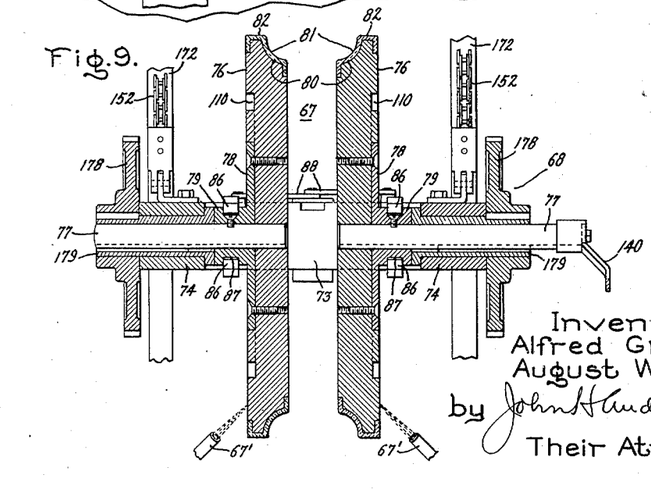
Fig. 9 is a vertical section on the line 9—9 of Fig. 8.
Figure 10:
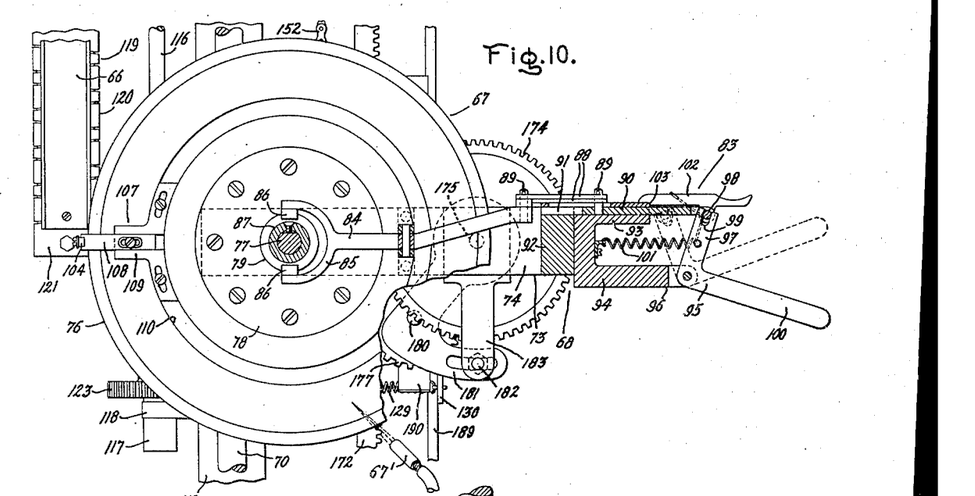
Fig. 10 is a vertical section on the line 10—10 of Fig. 8.

Suitable control means 83 are provided on the drum lift carriage 68 for moving the two discs 76 axially towards and away from each other, as desired, to thereby either close or separate the two halves of the drum. As shown particularly in Figs. 8 to 10, the said disc control means 83 comprises a pair of levers 84 extending alongside the drum discs 76 outwardly thereof, and pivoted intermediate their ends on the yoke arms 74 for pivotal movement in a horizontal plane. The levers 84 are provided with yoked forward ends 85 which span the collars 79 fastened to the discs 76 and carry opposed rollers 86 which ride in annular grooves 87 in the said collars 79. Pivotal movement of the levers 84 to open and close the drum discs 76 is effected by a toggle mechanism comprising a pair of toggle links 88 pivotally connected at one end to the rear ends of the respective levers 84. At their other ends, the toggle links 88 are pivotally connected by a pin 89 to a slide member 90 which is slidably mounted in a guideway 91 formed partly in the cross arm 92 of the carriage frame 73 and partly in one arm 93 of a U-shaped bracket 94 fastened to the back side of the frame cross arm 92. The guideway 91 extends horizontally in a direction normal to the axis of rotation of the envelope reshaping drum 67. Sliding movement of the slide 90 in its guideway 91, to thereby pivot the levers 84 and so open or close the drum discs 76, is effected by a bell crank lever 95 pivoted at its apex on the other arm 96 of the bracket 94. One arm 97 of the bell crank lever 95 is pivotally connected to the slide 90 by a pin and slot arrangement, the slide 90 carrying a pivot pin 98 which fits within a slot 99 in the end of the lever arm 97. The other arm 100 of the bell crank lever 95 serves as a handle for operating the same.

In their closed position, the drum discs 76 are held in spring-pressed face to face interengagement by a pair of tension coil springs 101 anchored at one end to the base of the slide bracket 94 and connected at their other ends to the arm 97 of the bell crank lever 95. The drum discs, however, are normally held in an axially separated position, against the force of the springs 101, by means of a catch 102 in the form of a detent or latch pivoted on the slide pivot pin 98 and notched at its forward end to provide a shoulder 103 for engagement with the rear end of the bracket arm 93.

The forming drum 67 is provided with a suitable holder 104 for gripping the lower end cap 7 of the lamp envelope to thereby clamp the lower end of the said envelope to the periphery of the drum discs 76. As shown particularly in Figs. 8 and 10, the said holder 104 comprises a pair of complementary facing semicircular jaws 105 mounted on the discs 76 in positions transversely of and concentrically within the grooved portions 80 of their respective discs, with the open ends of the jaws facing and aligned with one another so as to form, when the jaws are brought together, a complete ring for encircling the lower end cap 7 of the envelope. The walls 106 of the jaw openings are suitably bevelled to enable the opposing jaws 105 to enter the restriction 10 at the base of the end cap boss 8 and firmly grip the said end cap therebetween, thus preventing the end cap 7 from being pulled out of the holder 104. The jaws 105 are supported in suitable adjustable mountings 107 which provide a limited amount of adjustment for the jaws. The said mountings 107 comprise jaw holder slides 108 which are slidably mounted in holder blocks 109 for adjusting movement radially of the discs 76. The holder blocks 109 are fastened to the drum discs 76 and ride in annular grooves 110 in the outer side faces of the said discs 76 to permit adjustment of the jaws 105 to any desired position around the periphery of the drum discs 76.

The drum lift carriage 68 is normally located in a lowered or starting position (as shown in Fig. 1) wherein the envelope gripping jaws 105 on the drum discs 76 are horizontally aligned with, and in proper gripping relation to the lower end cap 7 of the lamp envelope 2 when the latter has been heated to its proper bending temperature and has elongated to its predetermined length as determined by the engagement of the lower holder collar 61 with the limiting stop 62. The drum lift carriage 68 is supported in its said lowered position by the engagement of the lower ends of the carriage frame bushings 75 with suitable stops 111 secured to the guide columns 70.

The clamping of the lower end of the heated lamp envelope 2 to the periphery of the drum 67 is accomplished by first advancing the drum assembly carriage 69 along the track 53 to its forward or operative position (as determined by its engagement with stops 112 on the track) wherein the envelope gripping jaws 105 on the drum discs 76 are positioned abreast of the lower end cap 7 of the lamp envelope. As in the case of the furnace carriage 52, the advancing movement of the carriage 69 along the track, as well as the subsequent retracting movement thereof, may be effected by automatic means, such as by an air cylinder B (Figs. 14, 16 and 17) the piston of which is connected to the carriage 69 by a connecting rod 69'. The drum assembly carriage 69 is positively locked in its forward position, during the ensuing envelope bending operation, by means of a ratchet comprising a pawl 113 on the carriage 69 which drops into a notch in a ratchet stop 114 mounted on the upper side of the table top 40. After the drum assembly carriage 69 has been thus advanced and locked in its forward or operative position, the separated drum discs 76 are brought together to cause the gripping jaws 105 to close around the boss 8 on the lower lamp end cap 7 and thus firmly clamp the lower end of the envelope to the drum 67 within the groove 81 therein. The closing of the drum discs 76 is effected by releasing the catch detent 102 from engagement with the end of the bracket arm 93 and allowing the pull of the springs 101 to pivot the bell crank lever 95 and thus actuate the slide 90, toggle links 88, and levers 84 to bring the drum discs 76 together.

The advancing movement of the drum assembly carriage 69 along the track 53 to its forward position also serves to automatically position the envelope back support 66 in proper envelope supporting position so as to prevent backward bowing of the envelope during the bending thereof. As shown particularly in Fig. 11, the envelope back support 66 comprises an asbestos covered vertically extending channel or trough coextensive with the lamp envelope 2 and having a semicircular cross section conforming to the cross sectional curvature of the lamp envelope. The back support 66 is carried by a plurality of bracket arms 115 which are mounted on and fixedly secured to a vertically extending shaft 116 extending alongside the drum 67 adjacent the forwardly facing peripheral portion thereof. The shaft 116 is journalled in bearings 117 carried by brackets 118 fastened to the guide columns 70. The bracket arms 115 also carry heating means 119 for maintaining the back support 66 in a heated condition so as not to crack the glass lamp envelope 2 upon contact therewith. The said heating means 119 comprises a vertically extending bar 120 of suitable refractory material, such as Transite for instance, disposed closely adjacent the back side of and coextensive with the back support 66. The front side 121 of the bar 120, i. e. the side facing the back support 66, is provided with a high-resistance heating wire 122 which is wound back and forth across the said front face 121 of the bar throughout its full vertical extent.

At its lower end, the shaft 116 carries a spur gear 123 which meshes with a sector gear 124 pivotally mounted on a vertical stud 125 carried by an angular extension 126 on the lowermost bracket 118. The sector gear 124 is provided with an arm 127 extending more or less transversely of the carriage track 53 and carrying a roller 128 at its outer end.

Figure 11:
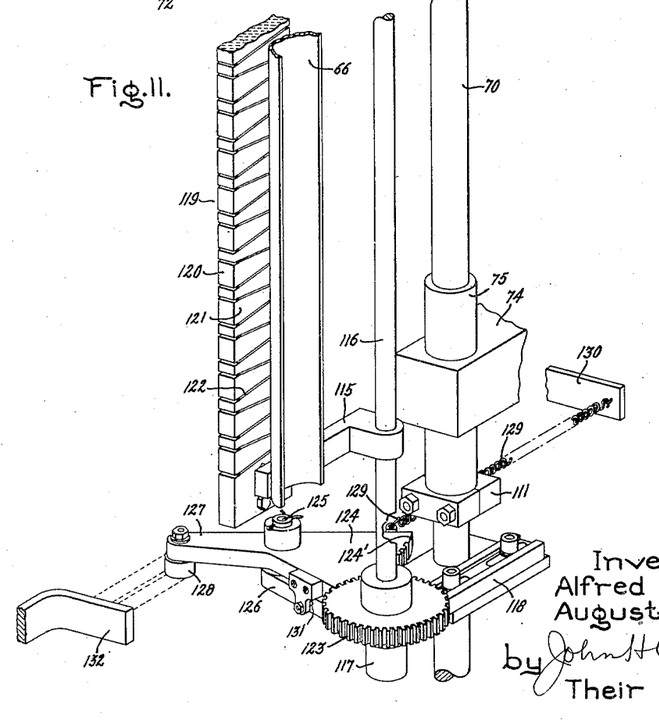
Fig. 11 is a fragmentary perspective view of the envelope back support and associated operating mechanism therefor.

The sector gear 124 is normally maintained in a retracted position (as shown in Fig. 11) wherein the envelope back support 66 is swung a sufficient distance to one side from its actual envelope supporting position (preferably around 90° or thereabouts) so as to clear the lamp envelope 2 during the advancing movement of the drum assembly carriage 69 to its forward position on the track 53. The sector gear 124 is normally held in such retracted position by the action of a tension coil spring 129 connected at one end to the sector gear and anchored at its other end to a stationary part of the drum assembly carriage, such as an anchor bracket 130 especially provided for such purpose. The retracted position of the sector gear 124 is determined by the engagement of a stop pin 131 carried by the sector gear with the extension 126 on the lower bracket 118.

During the latter part of the advancing movement of the drum assembly carriage 69 to its forward position on the track 53, the roller 128 on the sector gear 124 engages a stationary stop plate 132 fastened to the side bar 18 of the envelope supporting framework 16. This engagement of the roller 128 with the stop plate 132 causes the sector gear 124 to pivot and thus rotate the spur gear 123 and its associated shaft 116 so as to swing the back support 66 inwardly, around the back of the envelope 2, and position it in its envelope supporting position just as the drum assembly carriage 69 reaches its forward position on the track 53. To prevent any tendency of the sector gear 124 to pivot beyond its advanced position and thus tend to swing the back support 66 beyond its envelope supporting position so as to strike a sudden and possibly damaging blow against the glass envelope 2, suitable stop means are provided preferably in the form of a short blank portion 124' on the sector gear at the rear end thereof, the said blank portion 124' being devoid of gear teeth. The blank portion 124' of the sector gear thus terminates rotation of the meshed gears 124 and 123 at the point where the envelope back support is in its proper envelope supporting position.

Just as the discs 76 come together and the jaws 105 grip the lower lamp end cap 7 following release of the disc control means 83, the lower lamp holder 15 is moved downwardly out of engagement with the lower end of the envelope so as to clear the said lower envelope end and the drum holder jaws 105 during the ensuing envelope bending operation. This downward withdrawal of the lower lamp holder 15 is automatically produced by means of a pair of solenoids 133 and 134 (Fig. 2) mounted on the table 17 respectively above and below the table top 40. The armature 135 of solenoid 133 is connected to the slide bar 62 and is arranged to pull the said bar laterally out from under the collar 61 on the lower holder support rod 38 when the solenoid 133 is energized. The armature 136 of the other solenoid 134 is connected to the lower holder support rod 38 by a tie rod 137 and is arranged to exert a downward pull on the holder rod 38 when the solenoid 134 is energized. The two solenoids 133 and 134 are simultaneously energized by the closure of a microswitch 138 mounted on an upstanding bracket 139 carried by the drum assembly carriage 69. The switch 138 is closed, during the very last part of the closing movement of the drum discs 76 and associated shafts 77, by an arm 140 carried by the outer end of one of the drum disc shafts 77 and engaging with the control finger 141 of the switch. Upon energization of the two solenoids 133 and 134 by the closure of switch 138, the armature 135 of solenoid 133 first draws the slide bar 62 laterally out from under the collar 61 on the lower holder rod 38 to thereby free the lower holder 15 for additional downward movement, after which the armature 136 of the other solenoid 134 then pulls the holder rod 38 downwardly so as to move the lower lamp holder 15 down to a position (as denoted by the dotted line indication 61'' of the collar 61) where it will not interfere with the drum holder jaws 105 and the lower end of the lamp envelope 2 during the ensuing bending operation.

As soon as the lower holder 15 has been thus lowered away from the lower end of the lamp envelope 2, the drum lift carriage 68 is immediately raised at a uniform rate and the drum 67 simultaneously rotated in the proper direction, at a uniform peripheral speed corresponding to the speed of upward movement of the drum, to thereby bend and wrap the lamp envelope 2 around the periphery of the drum within the groove 81 therein. The upward movement of the drum lift carriage 68 is effected by means of an electric motor 142 which is energized by the closure of a microswitch 143 (Fig. 2) mounted beneath the table top 40. The said switch 143 is closed, during the latter part of the downward movement of holder rod 38 by solenoid 134, through the engagement of an arm 144 on rod 38 with the actuating button 145 of the switch 143.

The electric motor 142 for raising the drum lift carriage 68 is mounted on a platform 146 at the top of the framework 71, 72 carried by the drum assembly carriage 69. The motor 142 is connected by a belt 147 to a speed reducer 148 also mounted on the frame platform 146 and having a horizontally disposed output shaft 149 extending parallel to the drum disc shafts 77. The speed reducer shaft 149 is journalled in bearings 150 mounted on the frame platform 146 and is provided with a pair of sprockets 151 for driving engagement with a pair of carriage-lifting roller chains 152. The said roller chains 152 are connected at one end to the individual arms 74 of the drum lift carriage frame 73 and extend up and around the sprockets 151 and thence over a pair of idler sprockets 153 mounted on an idler shaft 154 journalled in bearings 155 on the platform 146. The other ends of the roller chains 152 are connected to counterweights 156 freely movable along steeply inclined guide tracks 157. The said guide tracks 157 are in the form of bars or straps fastened at their lower ends to the drum assembly carriage 69 and at their upper ends to the platform 146, the said bars 157 thus constituting part of the supporting framework for the motor support platform 146. The counterweights 156 are supported on the guide bars 157 by sets of rollers 158 which engage and freely ride along opposite sides of the guide bars 157.

Figure 12:
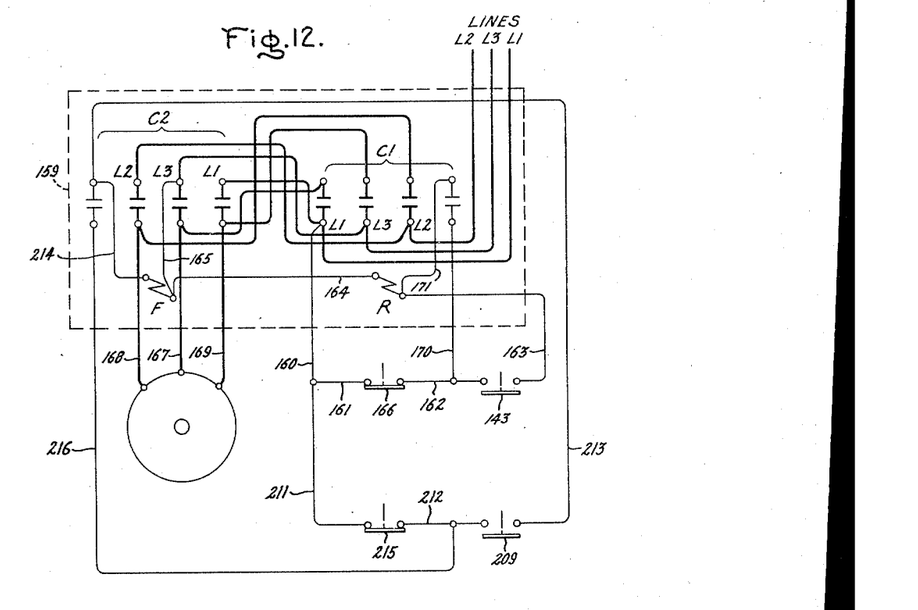
Fig. 12 is a diagram of the control circuit of the electric motor for raising and lowering the drum lift carriage.

As shown in Fig. 12, the closure of switch 143 connects the solenoid R of a magnetic motor reversing switch unit 159 across the lines L1 and L3 of a three-phase A. C. current supply, the circuit being completed through leads 160, 161, 162, 163, 164, 165 and a normally closed motor shut-off microswitch 166. The resulting energization of the solenoid R closes the bank of four normally open contacts C1 of the magnetic switch 159, thus connecting the motor leads 167, 168 and 169 to the three lines L1, L2 and L3, respectively, of the current source and so starting the operation of the motor. The closure of the contacts C1 also serves to close a shunt circuit 170, 171 across the motor starting switch 143. The magnetic motor reversing switch unit 159 may be of a well known type manufactured commercially. In such a type switch, when one bank of contacts C1 or C2 closes, the other bank is automatically maintained open.

The rotation of the drum 67, during the upward movement of the drum lift carriage 68 on guide columns 70, is produced by a separate disc-rotating mechanism for each of the drum discs 76, which mechanisms rotate the two discs in unison. As shown in Fig. 1, the disc-rotating mechanisms, which are of identical characteristics, comprise a pair of vertically extending racks 172 secured at their lower ends to the drum assembly carriage 69 and at their upper ends to the motor support platform 146. The two racks 172 extend alongside the respective arms 74 of the drum lift carriage frame 73 and are received within notches 173 (Fig. 8) in the said frame arms 74. A pair of spur gears 174, keyed to shafts 175 carried by the carriage frame arms 74, mesh with the teeth of the respective racks 172. Other spur gears 176 on the said shafts 175 mesh with idler gears 177 which, in turn, mesh with spur gears 178 keyed to bushings 179 (Fig. 9) on the drum disc shafts 77. The bushings 179 are keyed to, but axially slidable on the drum disc shafts 77. The idler gears 177 are rotatably mounted on shafts 180 carried by adjustable arms 181 which are pivoted on the shafts 175 and are fastened in proper position by locking bolts 182 threaded into brackets 183 depending from the carriage frame 73.

When the drum lift carriage 68 is moved vertically on the guide columns 70, the engagement of the racks 172 with gears 174 causes the gear shafts 175 to rotate. The resulting rotational movement of the said shafts 175 is then transmitted to the drum disc shafts 77, and thus to the drum discs 76 themselves, by the intermeshing gears 176, 177 and 178. As viewed in Fig. 1, the drum 67 is rotated in a counterclockwise direction when the drum lift carriage 68 is raised and in a clockwise direction when the said carriage is lowered. The various gears 174, 176, 177 and 178 comprising the disc rotating mechanisms are so selected as to impart the desired amount of rotation (slightly less than one full revolution) to the drum 67 during the upward travel of the drum lift carriage 68.

As the drum 67 starts to rotate upon raising of the drum lift carriage 68, the arm 140 on drum disc shaft 77 wipes off the control finger 141 of the solenoid operating switch 138, thus opening the said switch 138 and interrupting the circuit through solenoids 133 and 134. The resulting de-energization of solenoid 133 permits the solenoid armature 135 and thus the slide or stop 62 connected thereto, to be returned to and held in its normally "out" position (with the yoked end 63 of the stop 62 engaging the lower holder support rod 38) by the pull of a tension coil spring 184 which is fastened at one end to the pin 185 connecting the armature 135 and slide 62 and anchored at its other end to a post 186 on the slide block 64. Meanwhile, the resulting simultaneous de-energization of the other solenoid 134 permits the lower holder support rod 38 to be lifted by the expansive force of a light compression coil spring 187 mounted on the said rod and resting on the upper end of the sleeve bearing 39. The spring 187 raises the lower holder rod 38 only a short distance just sufficient to lift the switch operating arm 144 up off the switch control button 145 and open the motor starting switch 143, but not sufficient to raise the collar 61 to the level of the yoked end 63 of stop 62. Following the opening of the motor starting switch 143, the motor 142 continues to operate by virtue of the shunt circuit 170, 171 previously established across the switch 143 through closure of the bank of contacts C1 by the energized solenoid R.

The upward movement of the drum lift carriage 68 by the motor 142 continues until the envelope 2 has been completely bent or wrapped around the periphery of the drum 67 at which time the upward movement of the drum lift carriage 68 is terminated by the engagement of the carriage frame bushings 75 with upper stops 188 on the guide columns 70. However, just before the bushings 75 strike against the said stops 188, the electric motor 142 is de-energized by the opening of the switch 166 which is mounted on a vertically extending bar 189 carried by the drum assembly carriage 69. The switch 166 is opened by a wiper arm 190 which is carried by the drum lift carriage 68 and engages the control button 191 of the switch near the end of the upward movement of the said carriage 68. The wiper arm 190 is fastened to the outer end of one of the idler gear shafts 180. The opening of switch 166 interrupts the circuit through the solenoid R of the magnetic switch unit 159 thus de-energizing the said solenoid R and so permitting the bank of contacts C1 to open and so interrupt the motor current supply. The rotational inertia of the motor 142, following its de-energization by the opening of switch 166, carries the drum lift carriage 68 the remaining short distance upward to its uppermost position against the stops 188 before rotation of the motor actually stops. An electromagnetic brake 192 (Fig. 1) on the motor 142 effectively brakes and abruptly arrests the rotation of the motor shaft following the opening of the motor shut-off switch 166 and the de-energization of the motor.

Figure 13:
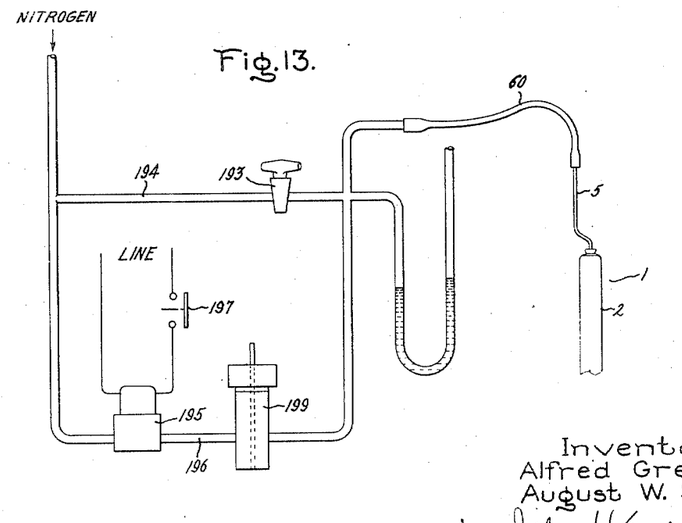
Fig. 13 is a diagrammatic illustration of the control mechanism for regulating the flow of inert gas to the lamp envelope.

In order that the envelope 2 possess the same cross-sectional shape after bending as it originally possessed, a gaseous pressure sufficiently above atmospheric is created within the envelope while the latter is still in a plastic condition. This gaseous pressure may be created at the very outset of, or at some time during the actual envelope bending operation and continued up until the end of such bending operation; or it may be created instead at the end of the envelope bending operation, or even after the end of such operation providing the envelope is still in a plastic condition. Preferably, however, the said gaseous pressure is created just as the bending of the envelope 2 is being completed, and is effected by increasing the pressure of the nitrogen or other inert gas flowing into the lamp envelope to an amount (for instance 3 to 6 inches, or so, head of mercury) sufficient to expand the plastic wall of the envelope to its original cross-sectional shape. Prior to such gas pressure increase, the flow of inert gas through the lamp envelope 2 is maintained at a relatively slight pressure, for instance at ½ inch, or so, head of water, by means of a valve or stop cock 193 (Fig. 13) which is connected in a bleeder line 194 and is so adjusted as to bleed the desired amount of inert gas into the envelope 2. The subsequent increase in the pressure of the inert gas within the envelope 2 may be produced by the opening of a normally closed solenoid valve 195 which is connected in a bypass line 196 connected around the bleeder line 194. The opening of the solenoid valve 195 is controlled by a normally open microswitch 197 which is mounted on the bar 189 in such a position as to be closed, by the engagement of the switch control finger 198 with the wiper arm 190, preferably just before the carriage 68 reaches its uppermost position. Upon opening of the solenoid valve 195, the flow of inert gas through the by-pass line 196 is thus added to the flow of inert gas through the bleeder line 194. A suitable pressure relief valve 199, connected in the by-pass line 196, controls the flow of inert gas through the by-pass line so that the combined flow of gas from the two lines 194, 196 will be at the desired pressure of from 3 to 4 inches head of mercury.

After the drum lift carriage 68 reaches its uppermost position and while it is held in such position by the counterweights 156, a temporary support 200 (Fig. 2) is positioned beneath and in engagement with the circularly bent lamp envelope 2 (as shown in dotted lines in Fig. 1), after which the two drum discs 76 are separated by operation of the disc control means 83 and the drum assembly carriage 69 then retracted or withdrawn along the track 53 to thereby dissociate the circular lamp assembly from the drum 67 and thus permit its removal from the upper lamp holder 14. The temporary envelope support 200 may comprise a V-block 201 fastened to one end of a lever 202 pivotally mounted on a bracket 203 fastened to one of the side bars 18 of the framework 16. Suitable locking means, such as a spring operated pin 204 mounted on the lever 202 and fitting into a slot 205 in the bracket 203, are provided for locking the envelope support 200 in proper envelope supporting position. The lever 202 may be provided with a handle 206 for swinging the envelope support to its envelope supporting position.

During the withdrawal movement of the drum assembly carriage 69 along the track 53, the front bar 207 of the said carriage strikes against the control button 208 of a normally open motor restart microswitch 209 mounted on a bracket 210 extending from the track 53. As shown in Fig. 12, the closure of switch 209 connects the solenoid F of the magnetic switch unit 159 across the lines L1 and L3 of the current supply, the circuit being completed through leads 160, 211, 212, 213, 214, 165 and a normally closed motor stop switch 215. The resulting energization of the solenoid F closes the bank of four normally open contacts C2 of the magnetic switch unit 159, thus connecting the motor leads 167, 168 and 169 respectively to lines L3, L2, L1 of the current supply and restarting the motor. However, because of the reversal of the connection of motor leads 167, 169 to lines L1, L3 from their previous connection through the contacts C1, the motor operates in a reverse direction so as to lower the drum lift carriage 68 on the guide columns 70. In addition to restarting the motor 142 in a reverse direction, the closure of the bank of contacts C2 also closes a shunt circuit 216 across the motor restarting switch 209.

The lowering of the drum lift carriage 68 by the motor 142 continues until the bushings 75 on the carriage frame 73 strike against the lower stops 111 on the guide column 70, thus positioning the carriage 68 once again in its lowered or starting position preparatory to the bending of the next lamp envelope assembly 1. Just before the carriage 68 reaches its lowered position, however, the wiper arm 140 on the carriage engages the control button 217 of, and opens the motor stop switch 215 mounted on the bar 189. The opening of the said switch 215 breaks the circuit through the solenoid F of the magnetic switch unit 159, thus opening the bank of contacts C2 and interrupting the motor current supply circuit. As in the case of the upward movement of the carriage 68, the rotational inertia of the motor 142, following its de-energization, lowers the drum lift carriage 68 the remaining short distance down to its starting position against the lower stops 111 before rotation of the motor is actually stopped by the electromagnetic brake 192 thereon. After the return of the carriage 68 to its lowered position, the lower lamp holder 15 is then manually reset, by withdrawing the stop 62 and lifting the collar 61 on rod 38 up past the yoked end 63 of the said stop, to again place the apparatus in condition for the next envelope bending operation.

Figures 14, 15:
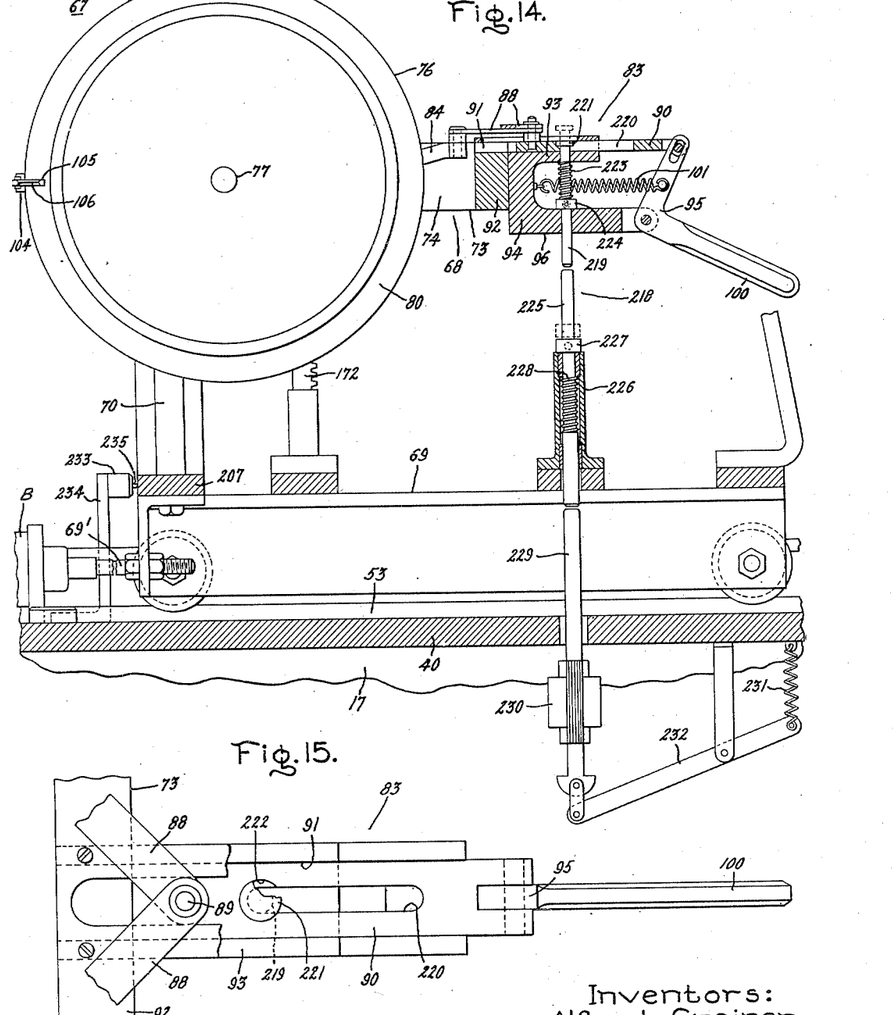
Fig. 14 is a fragmentary vertical section of a modified drum assembly carriage.
Fig. 15 is a fragmentary plan view of the modified drum disc control means shown in Fig. 14.

Figs. 14 and 15 illustrate a modification of the invention wherein the drum discs 76 are automatically closed or moved together just as the drum assembly carriage 69 reaches its forward or envelope bending position. Such automatic closure of the drum discs 76 may be effected by suitable release means 218 which automatically releases the disc control mechanism 83 so as to permit the self-operation of the said mechanism to thereby close the discs 76 together and thus clamp the lower end of the lamp envelope 2 to the drum periphery. As shown, the said release means 218 comprises a release pin 219 vertically reciprocable in the bracket 94 and projecting upwardly through a slot 220 in the drum disc operating slide 90. At its upper end, the pin 219 is provided with a head portion 221 which is receivable within a correspondingly shaped recess 222 (Fig. 15) in the upper side of the slide 90 to thereby lock the slide in its retracted or disc-separated position. The pin 219 is normally maintained in a lowered position, with its head portion 221 received within the slide recess 222, by the expensive force of a compression coil spring 223 mounted on the pin and compressed between the upper bracket arm 93 and a collar 224 fastened on the pin.

Mounted beneath and in vertical alignment with the release pin 219 is a push rod 225 vertically reciprocable in a bushing 226 mounted on the drum assembly carriage 69. The push rod 225 is normally maintained in a lowered position slightly spaced from the release pin 219, as determined by the engagement of a collar 227 on the said rod with the upper end of bushing 226, by the expansive action of a compression coil spring 228 mounted on the rod within the bushing 226 and compressed between shoulders on the said bushing and rod. When the drum assembly carriage 69 is located in its forward or envelope bending position as shown in Fig. 14, the push rod 225 is positioned over and in vertical alignment with the plunger 229 of a solenoid 230 mounted beneath the table top 40. The said plunger 229 projects upwardly through the table top 40 and is normally held in a lowered position, slightly spaced from the push rod 225, by the pull of a spring 231 acting through a lever 232 connected to the plunger.

Just as the drum assembly carriage 69 reaches its advanced or envelope bending position on the track 53, the solenoid 230 is energized by the closure of a microswitch 233 carried by a bracket 234 mounted on the table 17, the switch 233 being closed by the engagement of the front cross bar 207 of the carriage with the button 235 of the switch. The energization of the solenoid 230 raises the plunger 229 which then raises, in turn, the push rod 225 and the release pin 219 so as to lift the head 221 of the release pin out of the recess 222 in slide 90 (as shown in dotted lines in Fig. 14) and thus free the said slide for forward movement. The pull of the springs 101 then pivots the bell crank lever 95 to advance the slide 90 so as to effect the closure of the drum discs 76.

Figure 16:
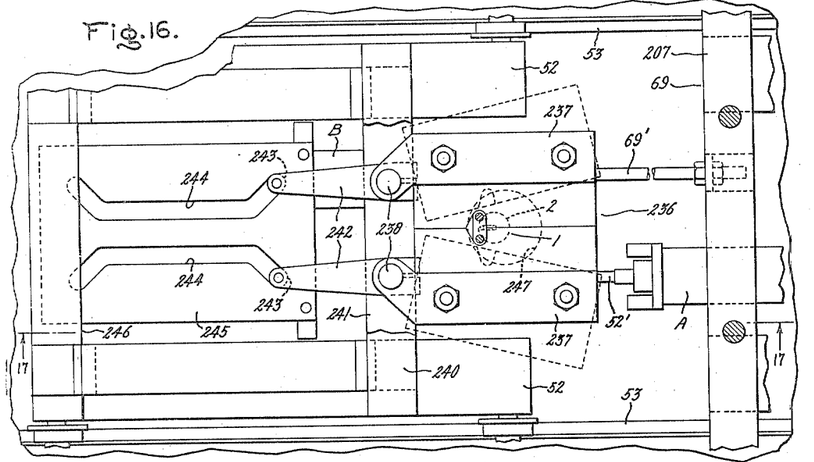
Fig. 16 is a plan view of a modified furnace arrangement.
Figure 17:
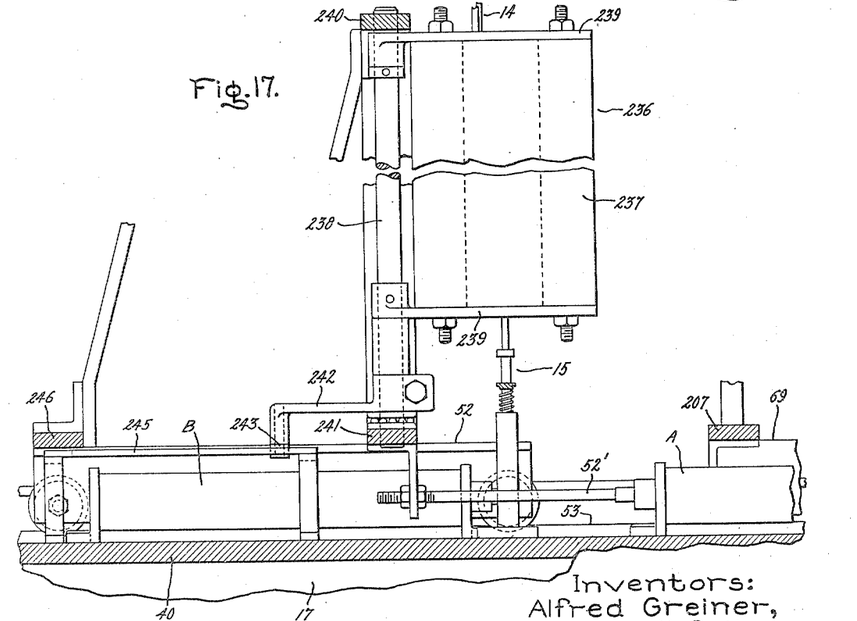
Fig. 17 is a vertical section on the line 17—17 of Fig. 16.

Figs. 16 and 17 illustrate a modified form of envelope heating furnace 236 which automatically opens and closes, during the movement of the furnace carriage 52 along the track 53, to allow entry and withdrawal of the lamp assembly 1. As shown, the furnace 236 is divided, in a vertical plane paralleling the track 53, into two complementary swinging sections 237, 237 respectively supported on vertically extending rotatable shafts 238, 238 by means of brackets 239 pinned or otherwise secured to the said shafts so as to rotate therewith. The shafts 238 are located adjacent the rear side of the furnace 236 and are journalled at their upper and lower ends in suitable bearings carried by upper and lower cross bars 240 and 241 of the furnace carriage frame. At their lower ends, the shafts 238 are provided with cam follower arms 242, 242 carrying rollers 243 which ride in separate cam tracks 244, 244 in a horizontally disposed cam plate 245. The cam plate 245 is suitably supported on the table 17 in a position below the level of the furnace carriage frame cross bars 241 and 246 so as to clear the said cross bars during movement of the carriage 52 along the track 53. The rollers 243, riding in the cam tracks 244 during movement of the furnace carriage 52 along the track 53, cause the follower arms 242 to swing and thus rotate the vertical shafts 238 so as to swing open or closed the furnace sections 237. The cam tracks 244 are so shaped as to swing the furnace sections 237 open (as shown in dotted lines in Fig. 16) during the very first part of the advance movement of the furnace carriage 52 along track 53 to its envelope heating position, and to then maintain the said furnace sections open until just before they are positioned abreast of the lamp assembly 1 whence they are finally closed around the lamp assembly during the very last portion of the carriage advance movement.

As shown in Fig. 16, when the furnace 236 is positioned in its envelope heating position with the sections thereof closed around the lamp envelope 2, the said envelope is preferably located in a position offset a slight distance rearwardly from the axis of the heating circle 247 defined by the inner cross sectional surface of the furnace so that the back side of the envelope (i. e., the side that is to form the outside of the circularly bent envelope and therefore has to stretch the most) receives a slightly greater amount of heating than the front side of the envelope. The same is true of the furnace 45 in Figs. 1 and 2.

The completed lamp may be provided with a base of the type shown in Patent 2,339,166, W. Harrison, with the base actually clamped to the peripheries of the end caps 7, or to the bosses 8 thereon.

Certain features of the apparatus herein disclosed, such as the separable forming drum or mold 67, are described and claimed in co-pending application Serial No. 534,536, A. Greiner, filed April 27, 1944 and assigned to the same assignee as this application.

What we claim as new and desire to secure by Letters Patent of the United States is:

1. The method of bending into arcuate shape a length of glass tube which comprises, heating the tube to a plastic condition extending from end to end, attaching one end of the plastic tube to the periphery of a forming mold, and then wrapping the tube around the periphery of the mold by rolling the mold along the tube.

2. The method of bending into arcuate shape a length of glass tube which comprises, heating the tube to a plastic condition extending from end to end, attaching one end of the plastic tube to the periphery of a forming mold, wrapping the tube around the periphery of the mold by rolling the mold along the tube, and preserving the original cross section of the tube by creating a gaseous pressure above atmospheric within the plastic tube.

3. The method of bending into arcuate shape a length of glass tube which comprises, heating the tube to a plastic condition extending from end to end, attaching one end of the plastic tube to the periphery of a forming mold, wrapping the tube around the periphery of the mold by rolling the mold along the tube, and preserving the original cross section of the tube by creating a gaseous pressure above atmospheric within the plastic tube approximately at the end of the bending operation.

4. The method of bending into arcuate shape a length of glass tube which comprises, supporting the tube in a vertical position, heating the tube to a plastic condition extending from end to end, attaching the lower end of the plastic tube to the periphery of a forming mold, and then wrapping the tube around the periphery of the mold by rolling the mold up along the tube.

5. The method of bending into arcuate shape a length of glass tube having end caps secured to its opposite ends which method comprises, supporting the tube by its end caps, heating the tube to a plastic condition extending from end to end, attaching the end cap at one end of the tube to the periphery of a forming mold, and then wrapping the tube around the periphery of the mold by rolling the mold along the tube.

6. The method of bending into arcuate shape a tubular electric discharge lamp having a coating of fluorescent material on the inner wall of the glass lamp envelope and end caps secured to its opposite ends which method comprises, supporting the lamp by its end caps, creating an atmosphere of inert gas at a slight pressure within the lamp, heating the glass lamp envelope to a plastic condition extending from end to end, attaching the end cap at one end of the lamp to the periphery of a forming mold, wrapping the lamp around the periphery of the mold by rolling the mold along the lamp, and increasing the pressure of the inert gas within the lamp approximately at the end of the bending operation to expand and restore to original cross-sectional shape those portions of the glass envelope which may have partially collapsed during the wrapping of the lamp around the mold.

7. The method of bending into arcuate shape a length of glass tube which comprises, heating the tube to a plastic condition extending from end to end, attaching one end of the plastic tube tangentially to and within an annular groove in the periphery of a rotatable drum axially separable at said groove into two sections, wrapping the tube around the periphery of the drum by rolling the drum along the tube, and separating said drum at the groove therein to dissociate the bent tube from the drum.

8. The method of bending a length of glass tube into arcuate shape which comprises, holding the tube by its upper end in a vertical position so that it is free to elongate, heating the tube to a plastic condition and, upon elongation of the tube to a predetermined length, bending the tube into arcuate shape.

9. Apparatus for bending into arcuate shape a length of glass tube heated to a plastic condition, said apparatus comprising means for supporting the tube, a rotatable and movable mold arranged to be located adjacent one end of the tube with the tube tangent thereto, means for attaching said one end of the tube to the periphery of the mold, means for simultaneously rotating the mold and moving it bodily in a direction longitudinally of the tube to cause the tube to be wrapped around the periphery of the mold, and control means actuated by attachment of the tube to the mold to set in operation the last-named means.

10. Apparatus for bending into arcuate shape a length of glass tube heated to a plastic condition, said apparatus comprising means for supporting the tube, a rotatable and movable mold arranged to be located adjacent one end of the tube with the tube tangent thereto, means for securing said one end of the tube to the periphery of the mold, means for simultaneously rotating the mold and moving it bodily in a direction longitudinally of the tube to cause the tube to be wrapped around the periphery of the mold, and means for creating a gaseous pressure above atmospheric within the plastic tube while it is on the mold to preserve its original cross-sectional shape.

11. Apparatus for bending into arcuate shape a length of glass tube heated to a plastic condition, said apparatus comprising means for supporting the tube, a rotatable and movable mold arranged to be located adjacent one end of the tube with the tube tangent thereto, means for securing said one end of the tube to the periphery of the mold, means for simultaneously rotating the mold and moving its bodily in a direction longitudinally of the tube to cause the tube to be wrapped around the periphery of the mold, means for creating a gaseous pressure above atmospheric within the plastic tube while it is on the mold to restore its original cross-sectional shape, and control means actuated by movement of said mold to render the last-named means operative approximately at the end of the tube bending operation.

12. Apparatus for bending into arcuate shape a length of glass tube comprising means for supporting the tube, means in operative relation to said tube supporting means for heating the tube to approximately uniform plastic condition around its full circumferential extent and throughout its entire length, a rotatable and movable forming drum arranged to be located adjacent one end of the tube with the tube tangent thereto and having an annular tube-receiving groove in its periphery and axially separable at said groove into two sections, means for securing said one end of the tube to the periphery of the drum within the groove therein, and means for simultaneously rotating the drum and moving it bodily in a direction longitudinally of the tube to cause the tube to be wrapped around the periphery of the drum within the groove therein.

13. Apparatus for bending into arcuate shape a length of glass tube heated to a plastic condition, said apparatus comprising means for supporting the tube from its upper end in a vertical position, a rotatable and movable mold arranged to be located at the lower end of the tube with the tube tangent thereto, means for securing the lower end of the tube to the periphery of the mold, and means for simultaneously rotating the mold and moving it bodily upwardly along the tube to cause the tube to be wrapped around the periphery of the mold.

14. Apparatus for bending into arcuate shape a length of glass tube comprising means for supporting the tube including a back support arranged to extend along one side thereof, means in operative relation to said tube supporting means for heating the tube to approximately uniform plastic condition around its full circumferential extent and throughout its entire length, a rotatable and movable mold arranged to engage with the other side of the tube and to be located at one end of the tube with the tube tangent thereto, means for securing said one end of the tube to the periphery of the mold, and means for simultaneously rotating the mold and moving it bodily in a direction longitudinally of the tube to cause the tube to be wrapped around the periphery of the mold.

15. Apparatus for bending a length of glass tube into arcuate shape comprising, means for supporting the tube in a vertical position and fixedly holding it by its upper end so that it is free to elongate in a downward direction, means in operative relation to said tube supporting means for heating the tube to a plastic condition while so supported, stop means in alignment with said tube supporting means for limiting elongation of the tube during heating to a predetermined length, a rotatable and movable mold arranged to be located adjacent the lower end of said tube with the tube tangent thereto, means for fixedly securing one end of the tube to the periphery of the mold, and means for simultaneously rotating the mold and moving it bodily vertically along the tube to cause the tube to be wrapped around the periphery of the mold.

16. Apparatus for bending into arcuate shape a length of glass tube heated to a plastic condition, said apparatus comprising means for supporting the tube and including a movable holder engaging one end of the tube, a rotatable and movable mold arranged to be located adjacent the said end of the tube with the tube tangent thereto, means for attaching the said one end of the tube to the periphery of the mold, means for disengaging and withdrawing said holder away from said tube end, control means to effect operation of the last-named means, means operable upon attachment of the tube to the mold to actuate the said control means, and means for simultaneously rotating the mold and moving it bodily in a direction longitudinally of the tube to cause the tube to be wrapped around the periphery of the mold.

17. Apparatus for bending into arcuate shape a length of glass tube heated to a plastic condition, said apparatus comprising means for supporting the tube and including a holder engaging one end of the tube, a rotatable and movable forming drum arranged to be located adjacent the said end of the tube with the tube tangent thereto and having an annular tube-receiving groove in its periphery and axially separable at said groove into two sections, means normally holding said drum sections separated, means for closing said drum sections, means on said drum for attaching the said one end of the tube to the periphery of the drum upon closure of the drum sections, means for disengaging and withdrawing said holder away from said tube end, control means operated by closure of the drum sections to actuate the last-named means, means for rotating the drum and moving it bodily along the tube to cause the tube to be wrapped around the periphery of the drum and control means operated by withdrawal of said holder to set in operation the last-named means.

18. Apparatus for bending into arcuate shape a length of glass tube heated to a plastic condition, said apparatus comprising means for supporting the tube, a rotatable forming drum arranged to be located adjacent one end of the tube with the tube tangent thereto and having an annular tube-receiving groove in its periphery and axially separable at said groove into two sections, means normally holding said drum sections separated, a carriage for said drum movable to advance the drum into and out of tube bending position, means for automatically closing the drum sections together, control means operated by the advance movement of the carriage to effect operation of the last-named drum closing means, means for securing one end of the tube to the periphery of the drum within the groove therein, and means for rotating the drum and moving it bodily along the tube to cause the tube to be wrapped around the periphery of the drum within the groove therein.

19. Apparatus for bending a length of glass tube into arcuate shape comprising, means for supporting said tube, an oven arranged to be located in operative relation to a tube in said supporting means for heating said tube to a plastic condition, an oven carrier movable to advance said oven into and out of tube heating position, a carriage mounted for movement longitudinally of the tube, a forming mold rotatably mounted on said carriage and arranged to be located adjacent one end of the tube with the tube tangent thereto, a carrier for the mold carriage mounted for movement to advance the mold into and out of tube bending position, means on said mold for securing said one end of the tube to the periphery of the mold, and means for rotating the mold during movement of the carriage longitudinally of the tube to thereby cause the tube to be wrapped around the periphery of the mold.

20. Apparatus for bending a length of glass tube into arcuate shape comprising, means for supporting said tube in a vertical position, an oven arranged to be located in operative relation to a tube in said supporting means for heating said tube to a plastic condition, a horizontally extending track under said tube supporting means, a carrier for said oven mounted for movement along said track to advance the oven into and out of tube heating position, a vertically extending second carrier mounted for movement along said track, a carriage slidably mounted on said second carrier for vertical movement thereon, a forming mold rotatably mounted on said carriage and movable into and out of the tube bending position adjacent the lower end of the tube with the tube tangent thereto by movement of said second carrier along the track, means on said mold for securing the lower end of the tube to the periphery of the mold, and means on said second carrier for rotating said mold during upward movement of the carriage on said second carrier to thereby cause the tube to be wrapped around the periphery of the mold.

21. The method of bending a length of glass tube into arcuate shape which comprises fusing metal end caps to the opposite ends of the tube, supporting the tube in a vertical position by gripping the end cap at the upper end thereof, heating the tube to a plastic condition, clamping the lower end of the tube to a point on the periphery of a forming mold by gripping the lower end cap, and then wrapping the tube around the mold by rolling the mold up along the tube.

22. In apparatus for bending a length of glass tube into arcuate shape, the combination of means for supporting the tube in a vertical position and fixedly holding it by its upper end so that it is free to elongate in a downward direction when heated, means in operative relation to said tube supporting means for heating the tube to a plastic condition, means for controlling elongation of the tube to a predetermined length, and means for thereafter bending the tube into arcuate shape.

23. The method of forming a length of glass tube into a coil which comprises preliminarily heating the tube to a plastic condition and stretching it to a predetermined length, and then bending it into coil form.

24. The method of forming a length of glass tube into a coil which comprises preliminarily heating the tube to a plastic condition and stretching it to a predetermined length, and then bending it into coil form by attaching one end of the tube to the periphery of a mold of a predetermined diameter and a circumference slightly larger than the said predetermined length of the tube and then wrapping the tube around the mold to form a coil having its ends spaced apart a definite predetermined distance.

25. The method of coiling a length of glass tube which comprises preliminarily fusing metal end caps to the opposite ends of the tube, suspending the tube in a vertical position by gripping the cap at the upper end thereof and heating the suspended tube to a plastic condition, and then gripping the cap at the lower end and bending the tube into a coil.

26. The method of coiling a length of glass tube which comprises preliminarily fusing metal end caps to the opposite ends of the tube, suspending the tube in a vertical position by gripping the cap at the upper end thereof and heating the suspended tube to a plastic condition for a time sufficient to stretch it to a predetermined length, and then gripping the cap at the lower end and bending the tube into a coil.

27. Apparatus for coiling glass tube comprising means for heating the tube to a plastic condition, means for supporting the tube in operative relation to said heating means in a manner to cause the tube to be stretched to a predetermined length, and means for thereafter coiling the plastic tube.

28. Apparatus for coiling glass tube comprising means for heating the tube to a plastic condition, means for supporting the tube in operative relation to said heating means in a manner to cause the tube to be stretched to a predetermined length, a rotatable mold arranged to be located adjacent one end of the tube with the tube tangent thereto, clamp means on said mold for gripping said one end of the tube, and means for rotating the mold to cause the tube to be wrapped around its periphery.

29. Apparatus for coiling glass tube comprising means for heating the tube to a plastic condition, means for suspending the tube in a vertical position from its upper end in operative relation to said heating means in a manner to cause the tube to be stretched to a predetermined length, and means for thereafter coiling the plastic tube.

30. Apparatus for coiling glass tube comprising means for heating the tube to a plastic condition, means for suspending the tube in a vertical position from its upper end in operative relation to said heating means in a manner to cause the tube to be stretched to a predetermined length, stop means in vertical alignment with said tube supporting means and spaced therefrom a predetermined distance to limit stretching of the tube, and means for thereafter coiling the plastic tube.

ALFRED GREINER.
AUGUST W. SEITZ.

REFERENCES CITED

The following references are of record in the file of this patent:

UNITED STATES PATENTS

| Number | Name | Date |
|---|---|---|
| 487,915 | Cottrell | Dec. 13, 1892 |
| 670,167 | Wood | Mar. 19, 1901 |
| 807,854 | Neuert | Dec. 19, 1905 |
| 974,288 | McCarroll | Nov. 1, 1910 |
| 1,763,071 | Smalley | June 10, 1930 |
| 2,089,899 | Pirani et al. | May 18, 1937 |
| 2,135,775 | Walker | Nov. 8, 1938 |
| 2,177,743 | Pfaff | Oct. 31, 1939 |
| 2,239,055 | Sawyer | Apr. 22, 1941 |
| 2,301,940 | Fries | Nov. 17, 1942 |